United States Patent
Okabe et al.

(10) Patent No.: US 8,313,872 B2
(45) Date of Patent: Nov. 20, 2012

(54) FUEL CELL AND FASTENING DEVICE FOR FUEL CELL

(75) Inventors: Hiroki Okabe, Mishima (JP); Yutaka Hotta, Susono (JP)

(73) Assignee: Toyota Jidosha Kabushiki Kaisha, Toyota-shi (KR)

( * ) Notice: Subject to any disclaimer, the term of this patent is extended or adjusted under 35 U.S.C. 154(b) by 153 days.

(21) Appl. No.: 12/297,360

(22) PCT Filed: Feb. 28, 2008

(86) PCT No.: PCT/IB2008/000434
§ 371 (c)(1),
(2), (4) Date: Oct. 16, 2008

(87) PCT Pub. No.: WO2008/107756
PCT Pub. Date: Sep. 12, 2008

(65) Prior Publication Data
US 2009/0087720 A1 Apr. 2, 2009

(30) Foreign Application Priority Data
Mar. 2, 2007 (JP) ................................. 2007-052333

(51) Int. Cl.
*H01M 2/02* (2006.01)
(52) U.S. Cl. ........ 429/470; 429/152; 429/452; 429/467; 429/468; 429/469
(58) Field of Classification Search .................. 429/467, 429/468, 469, 470
See application file for complete search history.

(56) References Cited

U.S. PATENT DOCUMENTS

| 6,720,101 | B1 * | 4/2004 | Dong et al. | 429/435 |
| 2002/0142209 | A1 * | 10/2002 | Kikuchi et al. | 429/34 |
| 2006/0177722 | A1 | 8/2006 | Inagaki | |
| 2006/0240307 | A1 * | 10/2006 | Suh | 429/37 |

FOREIGN PATENT DOCUMENTS

| GB | 2 336 937 | | 11/1999 |
| JP | 1 289072 | | 11/1989 |
| JP | 5 82153 | | 4/1993 |
| JP | 2000 48850 | | 2/2000 |
| JP | 2002 246062 | | 8/2002 |
| JP | 2003142052 | * | 5/2003 |
| JP | 2003 197250 | | 7/2003 |
| JP | 2004 185845 | | 7/2004 |
| JP | 2004 335336 | | 11/2004 |
| JP | 2005 18358 | | 1/2005 |
| JP | 2006 269159 | | 10/2006 |
| WO | 2005 008826 | | 1/2005 |

* cited by examiner

*Primary Examiner* — Patrick Ryan
*Assistant Examiner* — Ladan Mohaddes
(74) *Attorney, Agent, or Firm* — Oblon, Spivak, McClelland, Maier & Neustadt, L.L.P.

(57) ABSTRACT

A fuel cell includes: two end plates that sandwich a cell stack from both ends thereof in a stacking direction; a side member that defines a distance between the two end plates; a connecting bolt that connects the end plates and the side member by a bolt axial force acting substantially in the stacking direction; and a stopper portion that is provided in at least one of the end plates, and that contacts a surface of the side member that extends in the stacking direction and that is located substantially opposite from the cell stack.

10 Claims, 7 Drawing Sheets

FUEL CELL AND FASTENING DEVICE FOR FUEL CELL

FIELD OF THE INVENTION

The invention relates to a fuel cell that includes a cell stack made up of a plurality of stacked unit cells and that electrochemically generates electric power through the use of reactant gases. In particular, the invention relates to a structure in the fuel cell that fastens the cell stack.

BACKGROUND OF THE INVENTION

Japanese Patent Application Publication No. 2004-335336 (JP-A-2004-335336) discloses a fuel cell that has a structure for fastening a cell stack as described below. In this fuel cell, a pair of end plates that contact two opposite ends of a cell stack in the stacking direction, and a side member sandwiched between the two end plates are interconnected with a bolt axial force acting substantially in the stacking direction of the cell stack.

In the foregoing fuel cell, the reaction or withstanding force needed to prevent relative displacement between the end plates and the side member due to load from a direction intersecting with the stacking direction of the cell stack is dependent on the axial force of the connecting bolts that connect the end plates and the side member. Therefore, the connecting bolts need to be large in size in order to sufficiently secure the strength of the fuel cell. This gives rise to a problem of a size increase of the fuel cell.

DISCLOSURE OF THE INVENTION

It is an object of the invention to provide a fuel cell and a fastening device for the fuel cell that are capable of improving the strength of a structure that fastens a cell stack.

A first aspect of the invention relates to a fuel cell including: a cell stack in which a plurality of cells are stacked; two end plates that respectively contact two ends of the cell stack in a stacking direction of the cells; a side member that is sandwiched between the two end plates and defines a distance between the two end plates; and a connecting bolt portion that connects the end plates and the side member by a bolt axial force acting substantially in the stacking direction. The end plate includes a stopper portion that contacts a surface of the side member that extends in the stacking direction and that is located substantially opposite from the cell stack. According to this fuel cell, since the stopper portion provided in the end plate contacts the side member, the side member is restrained from moving in a direction that intersects with the stacking direction and that is toward a side substantially opposite from the cell stack. That is, the stopper portion can prevent the side member from moving away from the cell stack in a direction that intersects with the stacking direction. As a result, the end plates and the side member can be interconnected with a bolt axial force acting substantially in the stacking direction, and the strength of the fastening structure that fastens the cell track can be improved. The bolt axial force herein means the force that causes the connecting bolt portion to fasten the end plates and the side member together.

The foregoing fuel cell may further include constructions as follows. For example, the stopper member may be integral with the end plate. Furthermore, the end plate may include an end plate body and the stopper portion connected to the end plate body (i.e., the end plate body and the stopper member may be separate members). Therefore, by connecting the end plate body and the side member by a bolt axial force and then connecting the stopper portion to the end plate body, the process of mounting the end plate and the side member to the cell stack can easily be performed.

Furthermore, the side member may include a projected portion that is projected substantially in the stacking direction, and the stopper portion may include a caved-in portion that fits to the projected portion. Therefore, the positioning of the side member with respect to the end plate can easily be performed.

Furthermore, the side member may include a caved-in portion that is caved in substantially in the stacking direction, and the stopper portion may include a projected portion that fits to the caved-in portion. Therefore, the positioning of the side member with respect to the end plate can easily be performed.

The connecting bolt portion may include a male screw portion provided in the side member, and a female screw portion that is screwed to the male screw portion via the end plate.

A second aspect of the invention relates to a fastening device for a fuel cell that includes: two end plates that respectively contact two ends of a cell stack in which a plurality of cells are stacked, the two ends being located in a stacking direction of the cells; a side member that is sandwiched between the two end plates and defines a distance between the two end plates; and a connecting screw portion that is joined by screwing with a screw shaft extending substantially in the stacking direction so as to connect the end plate and the side member. The end plate includes a stopper portion contacts a surface of the side member that extends in the stacking direction and that is located substantially opposite from the cell stack.

A third aspect of the invention relates to a fuel cell that includes: a cell stack in which a plurality of cells are stacked; two end plates that respectively contact two ends of the cell stack in a stacking direction of the cells; a side member that is sandwiched between the two end plates and defines a distance between the two end plates; and a connecting bolt portion that connects the end plates and the side member by a bolt axial force acting substantially in the stacking direction. The end plate comprises a stopper portion, a portion of the side member is sandwiched between the stopper portion and the cell stack.

A fourth aspect of the invention relates to a fastening device for a fuel cell, that includes: two end plates that respectively contact two ends of a cell stack in which a plurality of cells are stacked, the two ends being located in a stacking direction of the cells; a side member that is sandwiched between the two end plates and defines a distance between the two end plates; and a connecting screw portion that is joined by screwing with a screw shaft extending substantially in the stacking direction so as to connect the end plate and the side member. The end plate comprises a stopper portion, and a portion of the side member is sandwiched between the stopper portion and the cell stack.

The forms of the invention are not limited to a fuel cell alone, but can also be applied to various forms, for example, a vehicle that runs by using electric power from a fuel cell, a fuel cell system that operates a fuel cell, a fastening device that fastens a cell stack, a method for fastening a cell stack, etc. Besides, it should be apparent that the invention is not limited to the foregoing forms at all, but can be carried out in various forms without departing from the gist of the invention.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF EMBODIMENTS

To further make apparent the construction and operation of the foregoing invention, a fuel cell to which the invention is applied will be described below.

Figure 1:
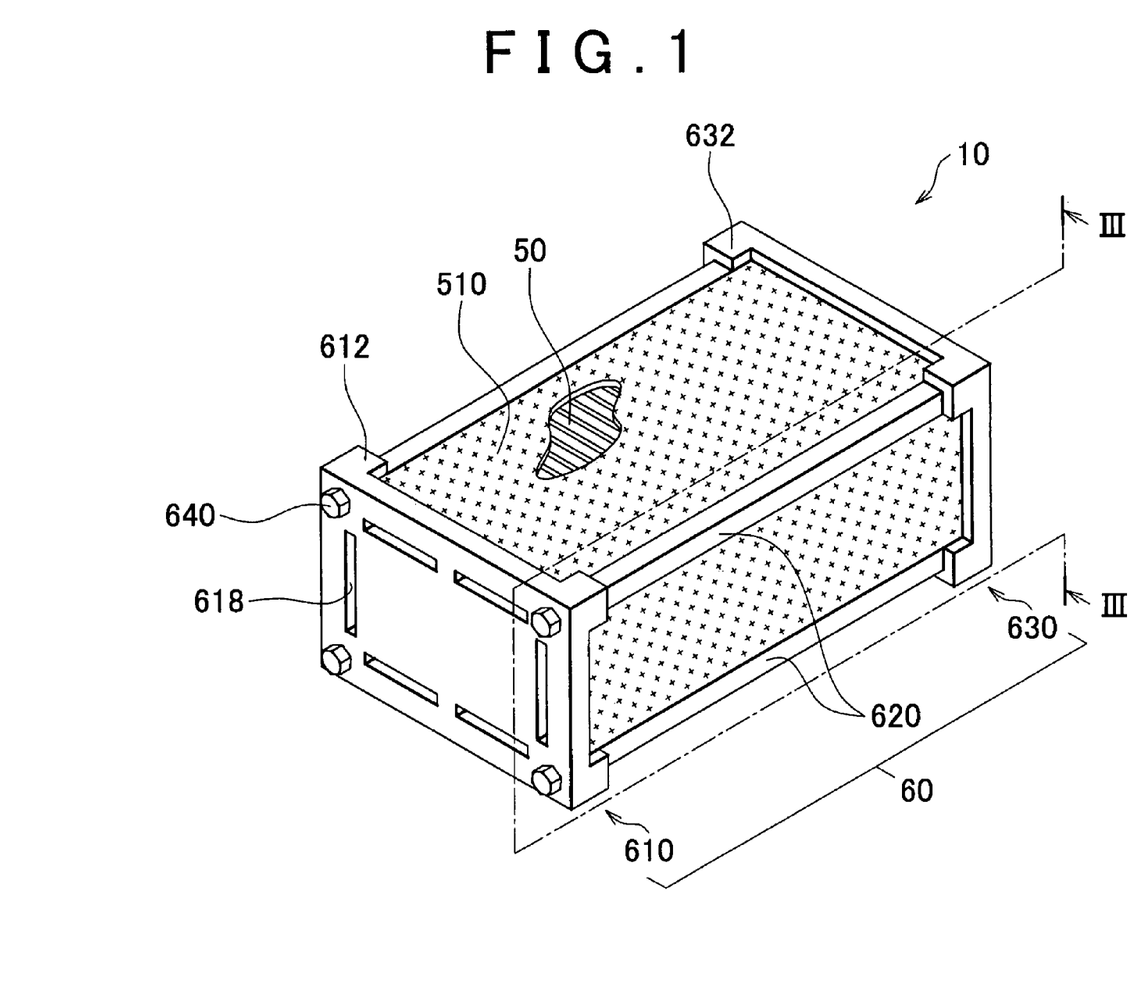
FIG. 1 is a perspective view showing an overall construction of a fuel cell 10.
Figure 2:
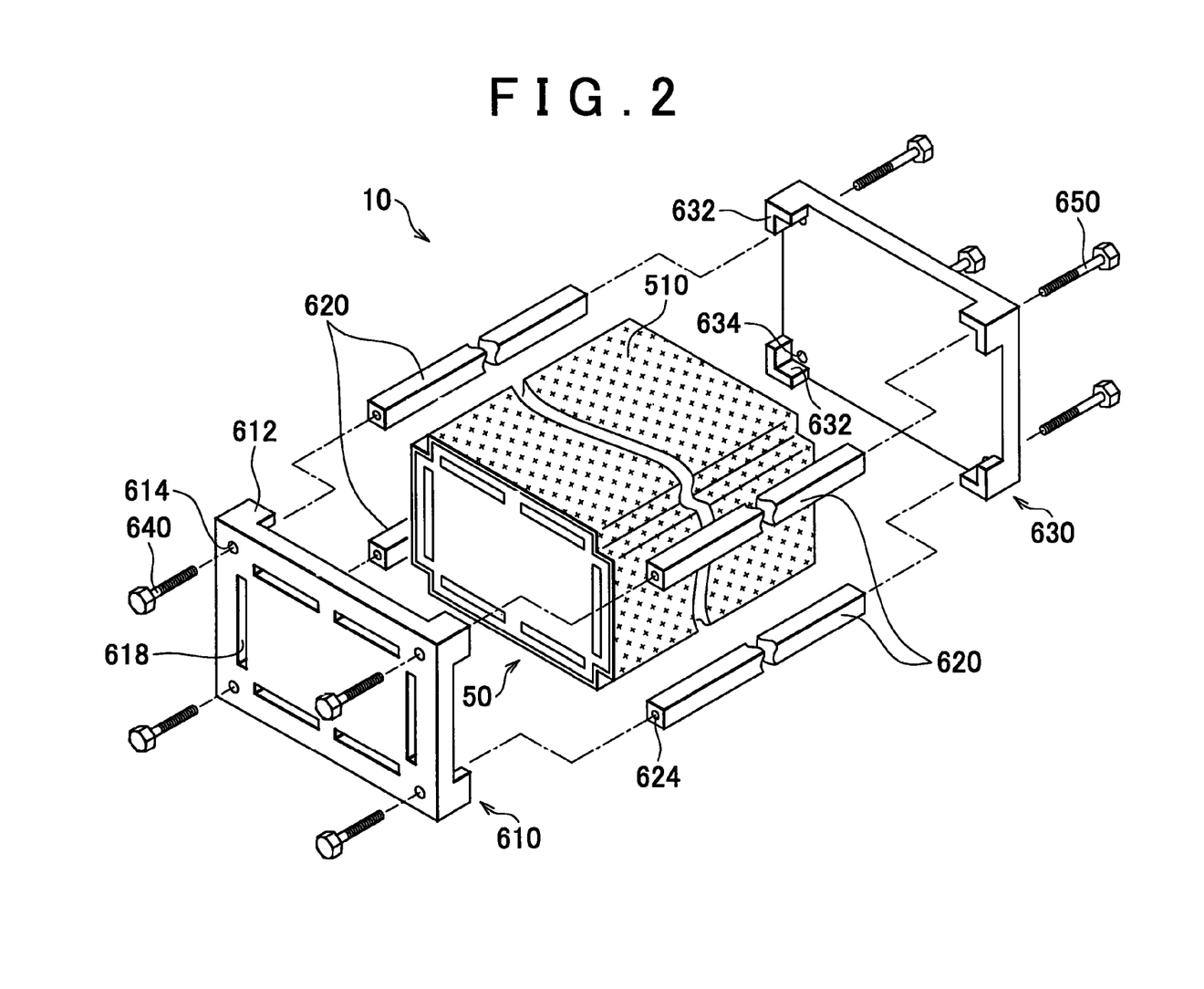
FIG. 2 is an exploded perspective view showing an overall construction of the fuel cell 10.
Figure 3:
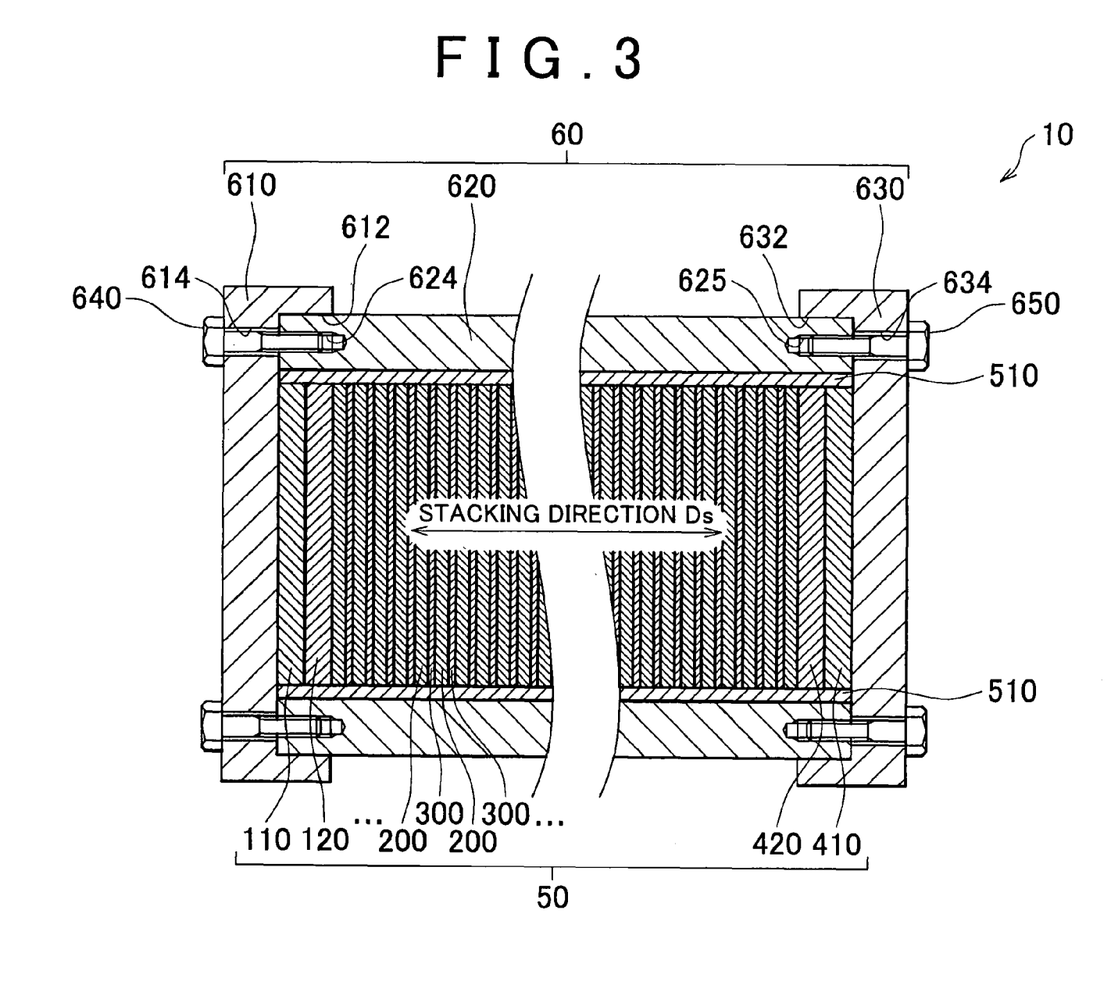
FIG. 3 is a sectional view showing a section of the fuel cell 10 taken on a plane III-III in FIG. 1.

A-1. Construction of Fuel Cell 10: As shown in FIGS. 1, 2 and 3, the fuel cell 10 includes a cell stack 50 made up of a plurality of stacked unit cells, and a fastening device 60 that fastens the cell stack 50. The fuel cell 10 generates electric power through the electrochemical reactions of reactant gases supplied from outside the fuel cell 10. In this embodiment, the fuel cell 10 is a polymer electrolyte fuel cell, and the reactant gases used by the fuel cell 10 are a fuel gas containing hydrogen, and an oxidizing gas containing oxygen. The fuel gas used in the fuel cell 10 may also be a hydrogen gas stored in a hydrogen tank or a hydrogen storage alloy, or may also be a hydrogen gas obtained by reforming a hydrocarbon-based fuel. The oxidizing gas used in the fuel cell 10 may be, for example, air taken from the outside. In this embodiment, the fuel cell 10 is a circulation-type fuel cell in which the fuel gas is circulated and reused. Specifically, the fuel gas supplied to the fuel cell 10 undergoes decreases in the hydrogen concentration with the progress of the electrochemical reactions, and is discharged as an anode-off gas to the outside of the fuel cell 10. Then, the anode-off gas is reused as a fuel gas. The oxidizing gas supplied to the fuel cell 10 undergoes decreases in the oxygen concentration with the progress of the electrochemical reactions, and is discharged as a cathode-off gas to the outside of the fuel cell 10.

Figure 4:
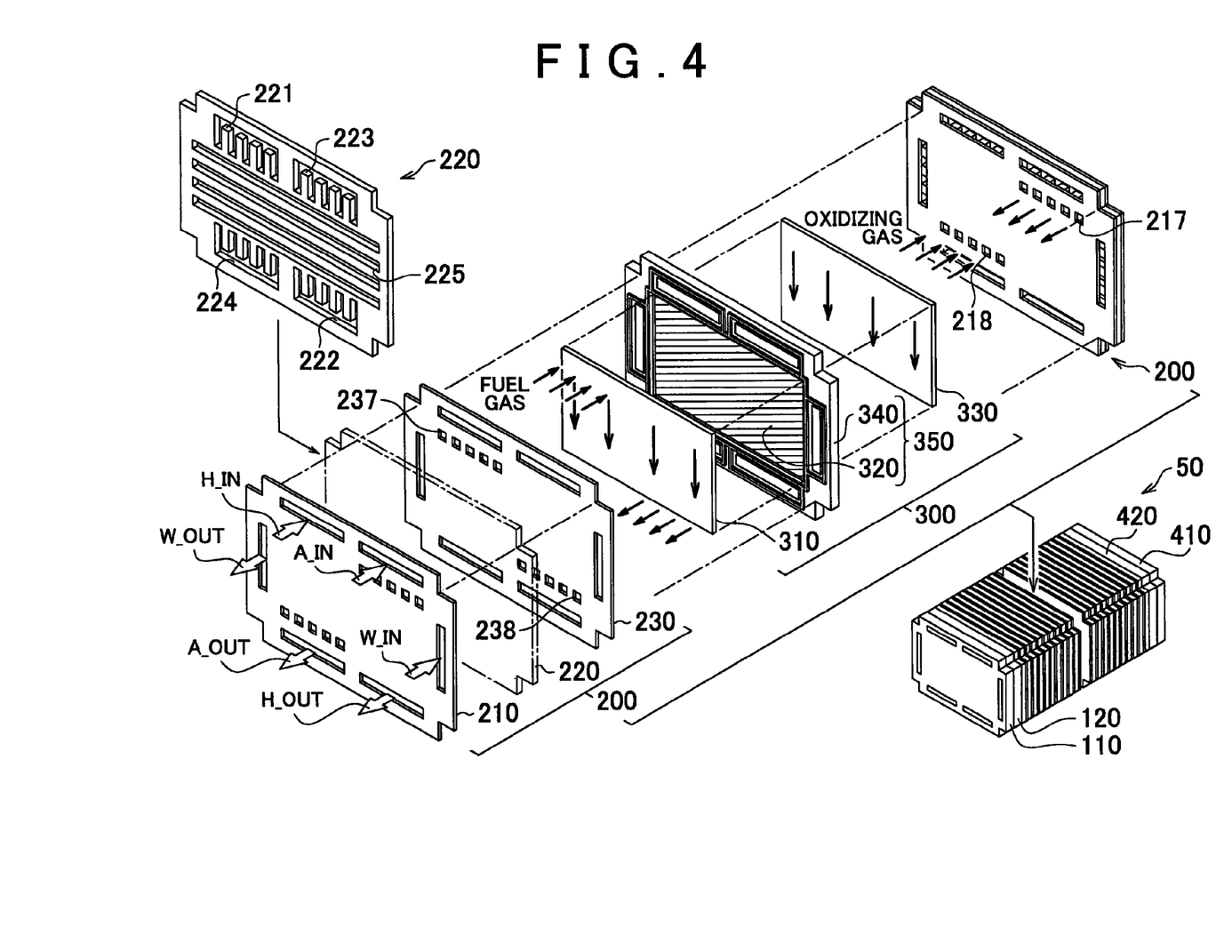
FIG. 4 is an illustrative diagram showing the construction of the cell stack 50 in detail.

FIG. 4 is an illustrative diagram showing the construction of the cell stack 50 in detail. As shown in FIG. 4, the cell stack 50 is constructed by stacking a plurality of platy members that are formed into substantially identical shapes, so that the cell stack 50 is a columnar structure whose section has the shape of the platy members. In this embodiment, as shown in FIGS. 2 and 4, the cell stack 50 has a shape that is obtained by cutting out, from the upstanding rectangular parallelepiped, four corner portions that extend from an upper surface to a bottom surface of the parallelepiped and that have a rectangular section. The cell stack 50 of the fuel cell 10 includes power generation plates 300 that each have a membrane-electrode assembly (MEA) 320 in which the electrochemical reactions of the reactant gases are conducted, and separators 200 that supply the reactant gases to the power generation plates 300. The power generation plates 300 and the separators 200 are alternately stacked. Therefore, the cell stack 50 has a plurality of unit cells in each of which a power generation plate 300 is sandwiched between two separators 200. The cell stack 50 includes a pair of terminals 120, 420 that sandwich, from opposite sides, a stack structure formed by alternately stacking the separators 200 and the power generation plates 300 and that collect the electricity generated by the unit cells, and a pair of insulators 110, 410 that further sandwich, from opposite sides, the stack structure sandwiched by the terminals 120, 420 and that achieve electrical insulation.

As shown in FIGS. 1, 2 and 3, the fuel cell 10 in this embodiment includes a constraining sheet 510 that protects the cell stack 50. The side surfaces of the cell stack 50 that extend in the stacking direction Ds are wrapped in the constraining sheet 510. In this embodiment, the constraining sheet 510 includes a sheet-like member made of rubber or polyurethane.

As shown in FIGS. 1, 2 and 3, the fuel cell 10 includes, as members constituting the fastening device 60, a pair of end plates 610, 630 sandwiching the cell stack 50 from both sides in the stacking direction Ds, side members 620 that define the distance between the end plates 610, 630 sandwiching the cell stack 50, connecting bolts 640 that interconnect the end plate 610 and the side members 620, and connecting bolts 650 that interconnect the end plate 630 and the side members 620.

The end plate 610 of the fastening device 60 is a metal-made platy member whose sectional shape is slightly larger in all the dimensions than the sectional shape of the cell stack 50. The end plate 610 includes: stopper portions 612 that are projected substantially in the stacking direction Ds of the cell stack 50 and that contact side surfaces of the side members 620, penetration hole portions 614 that are provided at positions corresponding to the side members 620 so as be penetrated through by the connecting bolts 640, and penetration hole portions 618 that communicate with channels that are provided in the cell stack 50 for supplying and discharging the reactant gases and cooling water. In this embodiment, as shown in FIG. 2 and 3, each of the stopper portions 612 of the end plate 610 contacts two of the surfaces of a side member 620 which extends in the stacking direction Ds of the cell stack 50 and which face a side substantially opposite from the cell stack 50. Therefore, the stopper portions 612 restrain the side members 620 from moving in directions that intersect with the stacking direction Ds of the cell stack 50 and that are toward a side opposite from the cell stack 50.

The end plate 630 of the fastening device 60 is a metal-made platy member whose sectional shape is larger in all the dimensions than the sectional shape of the cell stack 50. The end plate 630 has stopper portions 632 that are projected substantially in the stacking direction Ds of the cell stack 50 and that contact side surfaces of the side members 620, and penetration hole portions 634 that are provided at positions corresponding to the side members 620 so as to be penetrated through by the connecting bolts 650. In this embodiment, as shown in FIGS. 2 and 3, each of the stopper portions 632 of the end plate 630 contacts two of the surfaces of a side member 620 which face extends in the stacking direction Ds of the cell stack 50 and which are located substantially opposite from the cell stack 50. Therefore, the stopper portions 632 restrain the side members 620 from moving in directions that intersect with the stacking direction Ds of the cell stack 50 and that are toward a side opposite from the cell stack 50 (directions that are away from the cell stack 50).

The side members 620 of the fastening device 60 are metal-made pillar-shape members. Each of the side members 620 has a bolt hole portion 624 which is provided in one of end surfaces thereof that contacts the end plate 610 and which can be joined by screwing with a connecting bolt 640, and a bolt hole portion 625 which is provided in the other one of the end surfaces thereof that contacts the end plate 630 and which can be joined by screwing with a connecting bolt 650. In the embodiment, the fuel cell 10 has four side members 620 that have a prismatic shape. These four side members 620 are disposed in contact with the four corners of the cell stack 50 in a fitting fashion, with the constraining sheet 510 interposed therebetween.

The connecting bolts 640 of the fastening device 60 are metal-made bolts, and are inserted through the penetration hole portions 614 of the end plate 610 and screwed into the bolt hole portions 624 of the side members 620 substantially in the stacking direction Ds of the cell stack 50. Thus, the end plate 610 and the side members 620 are interconnected with a bolt axial force acting substantially in the stacking direction Ds of the cell stack 50.

The connecting bolts 650 of the fastening device 60 are metal-made bolts, and are inserted through the penetration hole portions 634 of the end plate 630 and screwed into the bolt hole portions 625 of the side members 620 substantially in the stacking direction Ds of the cell stack 50. Thus, the end plate 630 and the side members 620 are interconnected with a bolt axial force acting in substantially in the stacking direction Ds of the cell stack 50.

A-2. Operation and Effects: According to the foregoing fuel cell 10, the stopper portions 612, 632 provided on the end plates 610, 630 contacting the side members 620 restrain the side members 620 from moving in directions that intersect with the stacking direction Ds of the cell stack 50 and that are toward a side opposite from the cell stack 50. As a result, the end plates 610, 630 and the side members 620 can be interconnected with a bolt axial force acting in the stacking direction Ds of the cell stack 50, and the strength of the fastening structure that fastens the cell stack 50 can be improved.

While an embodiment of the invention has been described above, the invention is not limited to the foregoing embodiment at all. On the contrary, it is apparent that the invention can be carried out in various forms without departing from the gist of the invention. For example, the following modifications are possible.

Figure 5:
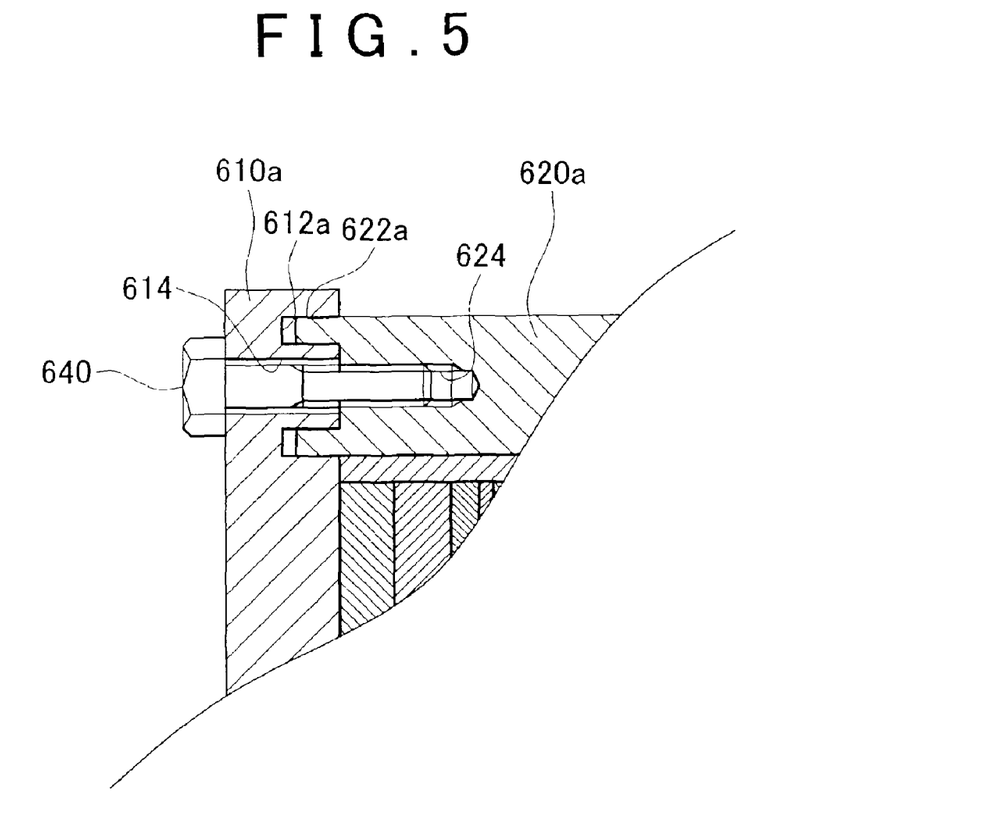
FIG. 5 is a sectional view showing a connecting structure between an end plate 610a and a side member 620a in a first modification.
Figure 6:
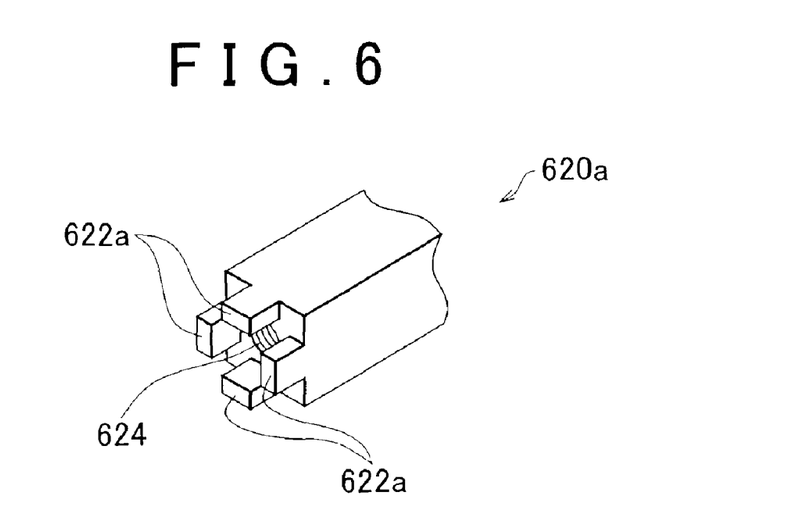
FIG. 6 is a fragmentary perspective view showing a portion of the side member 620a in the first modification.

B-1. First Modification: FIG. 5 is a sectional view showing a connecting structure between an end plate 610a and a side member 620a in a first modification. FIG. 6 is a fragmentary perspective view showing a portion of a side member 620a in the first modification. The construction of the fuel cell in the first modification is substantially the same as that of the fuel cell 10 in the foregoing embodiment, except that the end plate 610 and the side members 620 in the embodiment are replaced by the end plate 610a and the side members 620a.

The construction of the side members 620a in the first modification is substantially the same as that of the side members 620 in the foregoing embodiment, except that a surface of each side member 620a that extends substantially in a direction intersecting with the stacking direction Ds of the cell stack 50 and contacts the end plate 610a is provided with side projected portions 622a that are projected substantially in the stacking direction Ds of the cell stack 50. As shown in FIG. 6, in this modification, the four side projected portions 622a of each side member 620a are rectangular parallelepiped protrusions provided near the bolt hole portion 624 of the side member 620a.

The construction of the end plate 610a in the first modification is substantially the same as that of the end plate 610 in the foregoing embodiment, except that the stopper portions 612 of the end plate 610 in the embodiment are replaced by end caved-in portions 612a that fit to the side projected portions 622a of the side members 620a. As shown in FIG. 5, in this modification, the end caved-in portions 612a of the end plate 610a each define a caved-in space whose depth is greater than the length of the side projected portions 622a of the side members 620a, and contact surfaces of the side projected portions 622a of the side members 620a, of all the surfaces thereof, which extend in the stacking direction Ds of the cell stack 50 and which are located substantially opposite from the cell stack 50. Therefore, the end caved-in portions 612a restrain the side members 620a from moving in directions that intersect with the stacking direction Ds of the cell stack 50 and that are toward a side opposite from the cell stack 50.

According to the foregoing fuel cell of the first modification, since the end caved-in portions 612a provided in the end plate 610 fit to the side projected portions 622a of the side members 620a, the side members 620a are restrained from moving in the directions that intersect with the stacking direction Ds of the cell stack 50 and that are toward a side opposite from the cell stack 50. As a result, the end plate 610a and the side members 620a can be interconnected with a bolt axial force acting in the stacking direction Ds of the cell stack 50, and the strength of the fastening structure that fastens the cell stack 50 can be improved.

Figure 7:
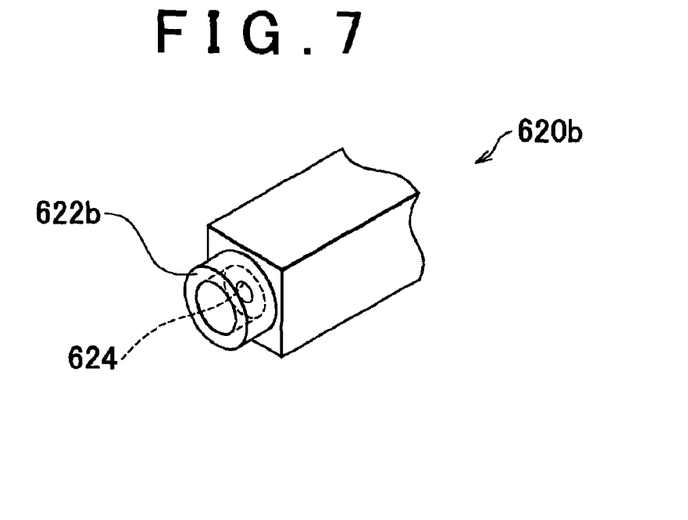
FIG. 7 is a fragmentary perspective view showing a portion of a side member 620b in a second modification.

B-2. Second Modification: FIG. 7 is a fragmentary perspective view showing a portion of a side member 620b in a second modification. The side member 620b is different from the side member 620a in the first modification in that while the side member 620a have four side projected portions 622a that are rectangular parallelepiped-shape protrusions provided near the bolt hole portion 624 of the side member 620a, the side member 620b in the second modification has a side projected portion 622b that is a hollow circular cylindrical protrusion surrounding the bolt hole portion 624 of the side member 620b. This construction also improves the strength of the fastening structure that fastens the cell stack 50, as in the first modification.

Figure 8:
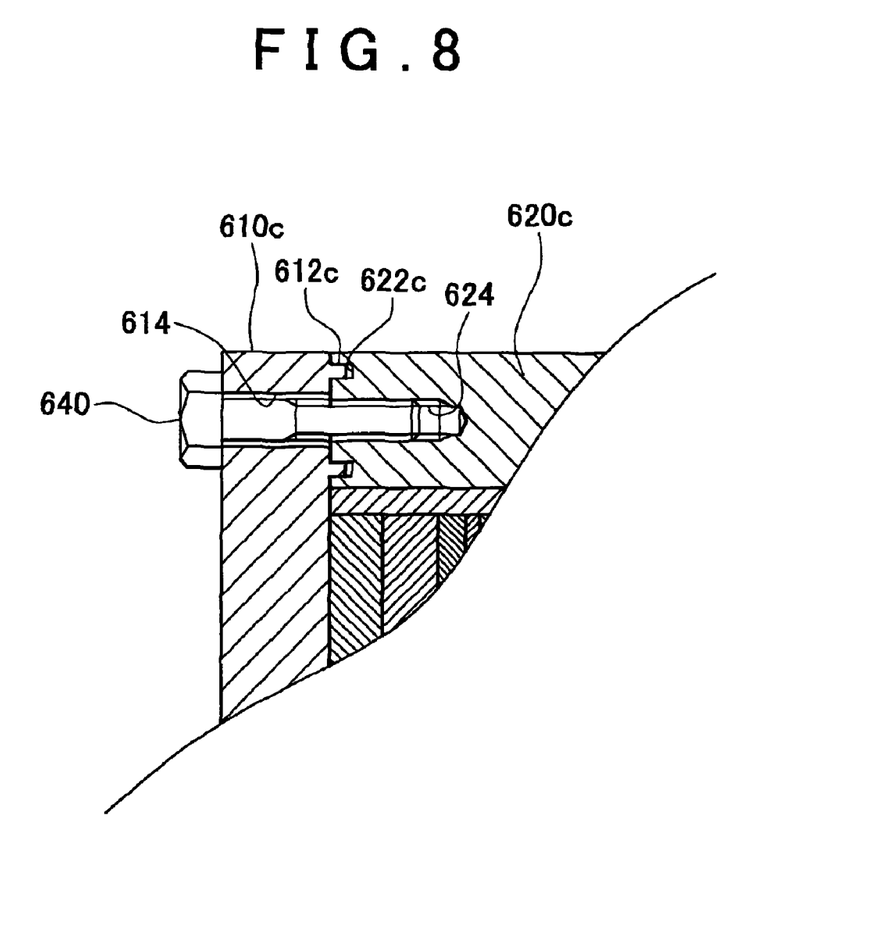
FIG. 8 is a sectional view showing a connecting structure between an end plate 610c and a side member 620c in a third modification.

B-3. Third Modification: FIG. 8 is a sectional view showing a connecting structure between an end plate 610c and a side member 620c in a third modification. The construction of the fuel cell of the third modification is substantially the same as that of the fuel cell 10 in the foregoing embodiment, except that the end plate 610 and the side members 620 in the embodiment are replaced by the end plate 610c and the side members 620c.

The construction of the end plate 610c in the third modification is substantially the same as that of the end plate 610 in the foregoing embodiment, except that the stopper portions 612 of the end plate 610 in the embodiment are replaced by end projected portions 612c projected substantially in the stacking direction Ds of the cell stack 50 from a surface of the end plate 610c that extends substantially in a direction intersecting with the stacking direction Ds and that contacts the side members 620c.

The construction of the side members 620c in the third modification is substantially the same as that of the side members 620 in the foregoing embodiment, except that each side member 620c in the third modification has side caved-in portions 622c that fit to the end projected portions 612c of the end plate 610c. As shown in FIG. 8, in this modification, the side caved-in portions 622c of the side members 620c each define a caved-in space whose depth is greater than the length of the end projected portions 612c of the end late 610c, and the end projected portions 612c of the end plate 610c contact surfaces of the side caved-in portions 622c of the side members 620c, of all the surfaces thereof, which extend in the stacking direction Ds of the cell stack 50 and which are located substantially opposite from the cell stack 50. Therefore, the end projected portions 612c restrain the side members 620c from moving in directions that intersect with the stacking direction Ds of the cell stack 50 and that are toward sides opposite from the cell stack 50.

According to the foregoing fuel cell of the third modification, since the end projected portions 612c provided in the end plate 610c fit to the side caved-in portions 622c of the side members 620c, the side members 620c are restrained from moving in the directions that intersect with the stacking direction Ds of the cell stack 50 and that are toward sides opposite from the cell stack 50. As a result, the end plate 610c and the side members 620c can be interconnected with a bolt axial force acting in the stacking direction Ds of the cell stack 50, and the strength of the fastening structure that fastens the cell stack 50 can be improved.

Figure 9:
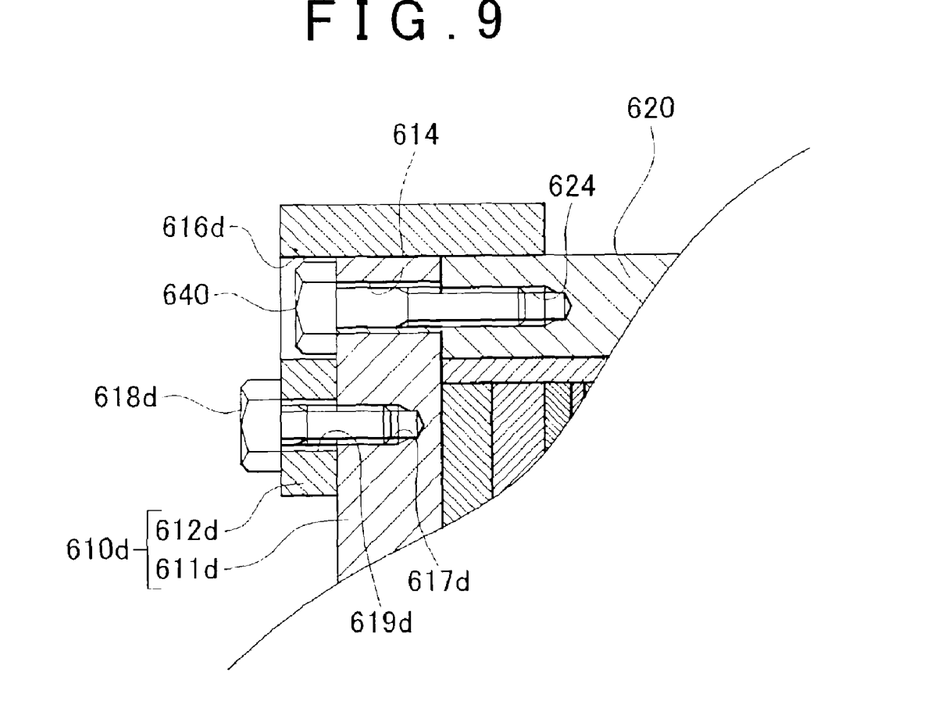
FIG. 9 is a sectional view showing a connecting structure between an end plate 610d and a side member 620 in a fourth modification.
Figure 10:
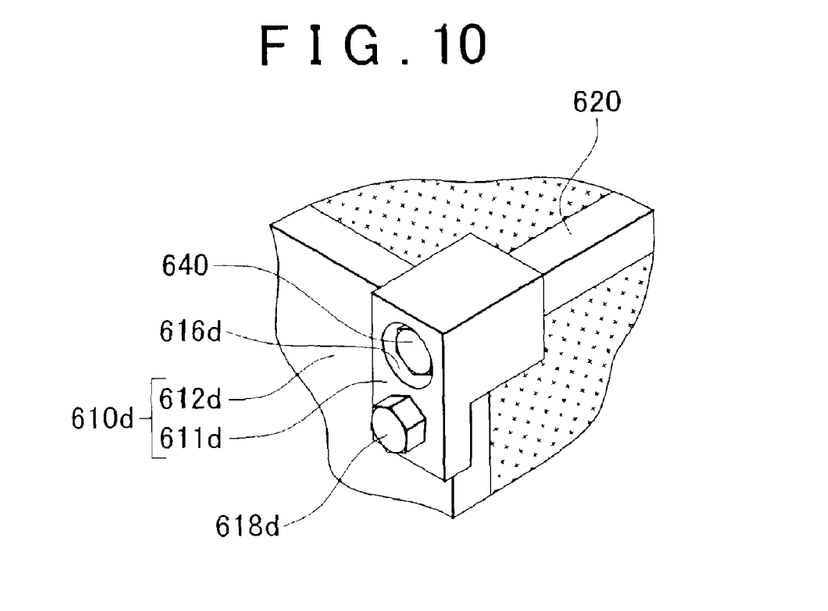
FIG. 10 is a fragmentary perspective view showing the connecting structure between the end plate 610d and the side member 620 in the fourth modification.

B-4. Fourth Modification: FIG. 9 is a sectional view showing a connecting structure between an end plate 610d and a side member 620 in a fourth modification. FIG. 10 is a fragmentary perspective view showing the connecting structure between the end plate 610d and the side member 620 in the fourth modification. The construction of the fuel cell of the fourth modification is substantially the same as that of the fuel cell 10 in the foregoing embodiment, except that the end plate 610 in the embodiment is replaced by the end plate 610d.

The end plate 610d in the fourth modification includes an end plate main body portion 611d that contacts the side members 620 as well as the cell stack 50, separate stopper portions 612d formed separately from the end plate main body portion 611d, and connecting bolts 618d that connect the separate stopper portions 612d to the end plate main body portion 611d. The end plate main body portion 611d of the end plate 610d has penetration hole portions 614 that are provided at positions corresponding to the side members 620 so as to be penetrated through by the connecting bolts 640, and bolt hole portions 617d that can be joined by screwing with connecting bolts 618d. Each of the separate stopper portions 612d of the end plate 610d has a penetration hole portion 616d that avoids interference between the separator stopper portion 612d and the connecting bolt 640 mounted to the end plate main body portion 611d, and a penetration hole portion 619d that can be penetrated through by a connecting bolt 618d.

The connecting bolts 618d of the end plate 610d are metal-made bolts, and are inserted through the penetration hole portions 616d of the separate stopper portions 612d and screwed into the bolt hole portions 617d of the end plate main body portion 611d in the stacking direction Ds of the cell stack 50. Thus, the separate stopper portions 612d are connected to the end plate main body portion 611d, and are projected substantially in the stacking direction Ds of the cell stack 50 and contact side surfaces of the side members 620.

According to the fuel cell of the fourth modification, since the separate stopper portions 612d connected to the end plate main body portion 611d contact the side members 620, the side members 620 are restrained from moving in directions that intersect with the stacking direction Ds of the cell stack 50 and that are toward sides opposite from the cell stack 50. As a result, the end plate 610d and the side members, 620 can be interconnected with a bolt axial force acting in the stacking direction Ds of the cell stack 50, and the strength of the fastening structure that fastens the cell stack 50 can be improved. Besides, by connecting the end plate main body portion 611d and the side members 620 by a bolt axial force and then connecting the separate stopper portions 612d to the end plate main body portion 611d, the process of mounting the end plate 610d and the side members 620 to the cell stack 50 can easily be performed.

In the foregoing embodiment and the first to fourth modification, a portion of the side member 620, 620a, 620b, or 620c is sandwiched between the stopper portion 612, the end caved-in portion 612a, the end projected portion 612c, or the separate stopper portion 612d and the cell stack 50. The stopper portion 612, the end caved-in portion 612a, the end projected portion 612c, and the separate stopper portion 612d can be regarded as the stopper portion of the present invention.

B-5. Other Modifications: Although the circulation-type fuel cells. have been described in conjunction with the foregoing embodiments and modifications, the invention may also be applied to a so-called dead-end type fuel cell in which the fuel gas supplied to the fuel cell is completely used, as another embodiment. Besides, although the stopper portions 612 of the end plate 610 in the foregoing embodiment are projected corresponding to the positions of the side members 620, a projected stopper portion extending along the entire periphery of the end plate 610 may also be suitable. Although in the first to fourth modifications, the construction of one of the end plates is changed from the construction thereof in the foregoing embodiment, the construction of the other end plate may also be similarly changed, and the constrictions of the foregoing embodiment and the first to fourth modifications may also be appropriately combined. Although in the embodiment, the end plates 610, 630 and the side members 620 are interconnected by the connecting bolts 640, 650, these members may also be interconnected by forming male screws on end portions of the side members 620 and screwing nuts thereto from the side of the end plates 610, 630.

The invention claimed is:
1. A fuel cell comprising:
a cell stack in which a plurality of cells are stacked;
a first end plate and a second end plate that respectively contact two ends of the cell stack in a stacking direction of the cells;
a plurality of side members that are sandwiched between the first and second two end plates and define a distance between the first and second end plates;
a connecting bolt portion that connects the end plates and the side member by at least one bolt, a longitudinal axis of the at least one bolt extends in the stacking direction such that a bolt axial force acts in the stacking direction; and
a plurality of stopper portions extending substantially perpendicularly from the first end plate toward the second end plate in a longitudinal axis direction of each of the respective side members,
wherein each of the plurality of stopper portions extends along and contacts a plurality of outer side surfaces of each of respective side members, the contacting surfaces of the stopper portions face in a direction intersecting with the stacking direction and are located on an opposite sides of the side members from the cell stack,
wherein each of the first and second end plates and each stopper portion are integrally provided,
wherein at least one side member includes a caved-in portion that is caved in the stacking direction, and wherein at least one stopper portion includes a projected portion that fits to the caved-in portion.

2. The fuel cell according to claim 1, wherein each stopper portion restrains the respective side member from moving in a direction that intersects with the stacking direction and restrains the respective side member from moving toward a side opposite from the cell stack.

3. The fuel cell according to claim 1, wherein:
at least one side member includes a contact surface that extends in a direction intersecting with the stacking direction and that contacts the end plate; and
the caved-in portion is caved in from the contact surface.

4. The fuel cell according to claim 1, wherein
the end plate comprises an end plate body and the stopper portion, and
each of the stopper portions is connected to the end plate body.

5. The fuel cell according to claim 1, wherein each of the stopper portions contacts an end portion of the respective side member.

6. A fastening device for a fuel cell, comprising:
a first end plate and a second end plate that respectively contact two ends of a cell stack in which a plurality of cells are stacked, the two ends being located in a stacking direction of the cells;
a plurality of side members that are sandwiched between the first and second end plates and define a distance between the first and second end plates;
a connecting screw portion that is joined by screwing with a screw shaft extending in the stacking direction so as to connect the end plate and the side member; and
a plurality of stopper portions extending substantially perpendicularly from the first end plate toward the second end plate in a longitudinal axis direction of each of the respective side members,
wherein each of the plurality of stopper portions extends along a longitudinal axis direction of the side members and contacts a plurality of outer side surfaces of each of the respective side members, the respective contacting surfaces of the stopper portion and the side member each extend in the stacking direction and are located opposite from the cell stack,
wherein each of the first and second end plates and each stopper portion are integrally provided,
wherein at least one side member includes a caved-in portion that is caved in the stacking direction, and
wherein at least one stopper portion includes a projected portion that fits to the caved-in portion.

7. The fuel cell according to claim 2, wherein
the end plate comprises an end plate body and the stopper portion, and the stopper portion is connected to the end plate body.

8. The fuel cell according to claim 2, wherein each stopper portion contacts an end portion of the respective side member.

9. The fuel cell according to claim 1, wherein each stopper portion contacts an end portion of the respective side member.

10. The fuel cell according to claim 1, wherein the at least one bolt extends into a respective aperture provided in the respective side member, and the at least one bolt extends along a longitudinal axis of the respective side member in the stacking direction between the two end plates.

* * * * *